Sept. 13, 1960

T. A. STEHLIN 2,952,269

REMOVABLE CORE-TYPE VALVE

Filed Nov. 28, 1955

THEODORE A. STEHLIN,
INVENTOR,

BY
O. D. Martin
ATTORNEY

Sept. 13, 1960 T. A. STEHLIN 2,952,269
REMOVABLE CORE-TYPE VALVE
Filed Nov. 28, 1955 3 Sheets-Sheet 2
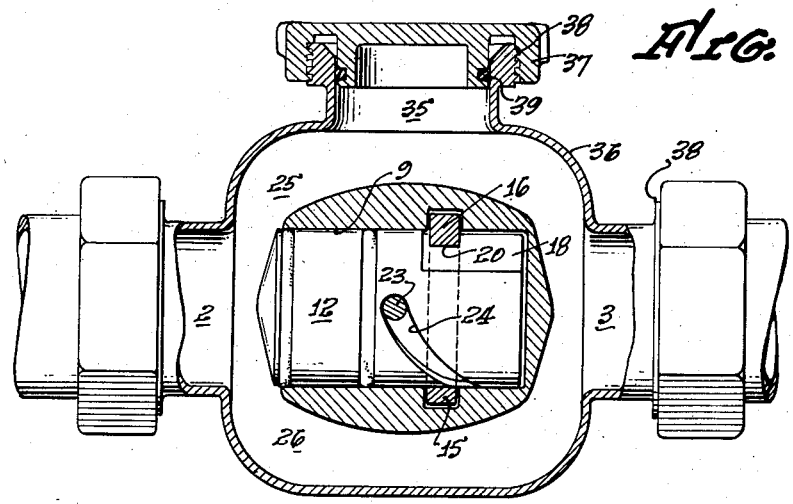
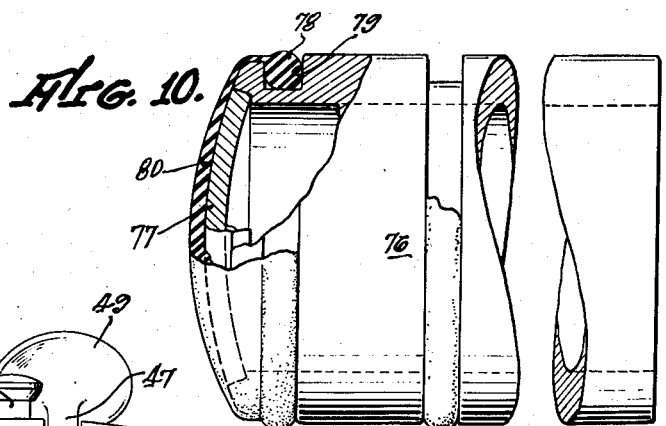
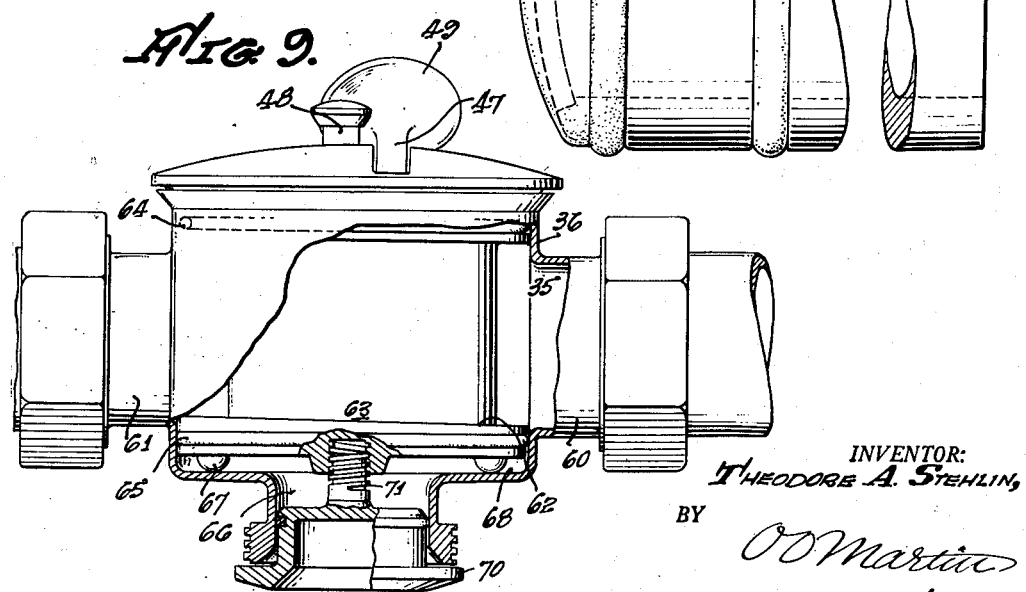
INVENTOR:
THEODORE A. STEHLIN,
BY
O. O. Martin
ATTORNEY.

Sept. 13, 1960 T. A. STEHLIN 2,952,269
REMOVABLE CORE-TYPE VALVE
Filed Nov. 28, 1955 3 Sheets-Sheet 3
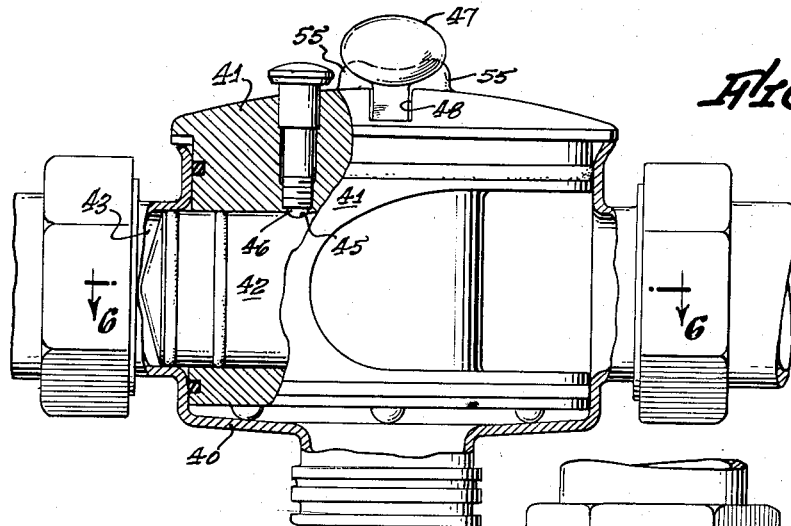
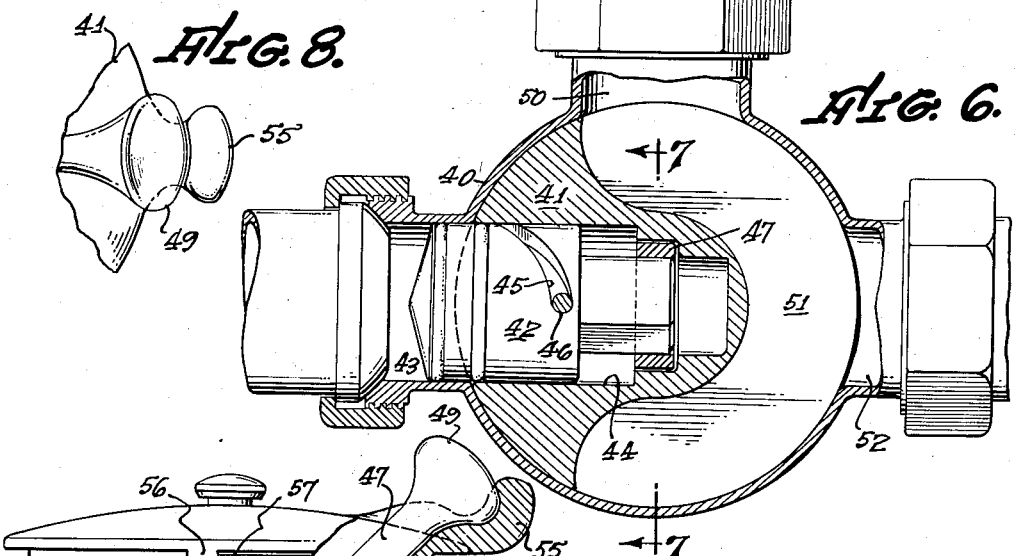
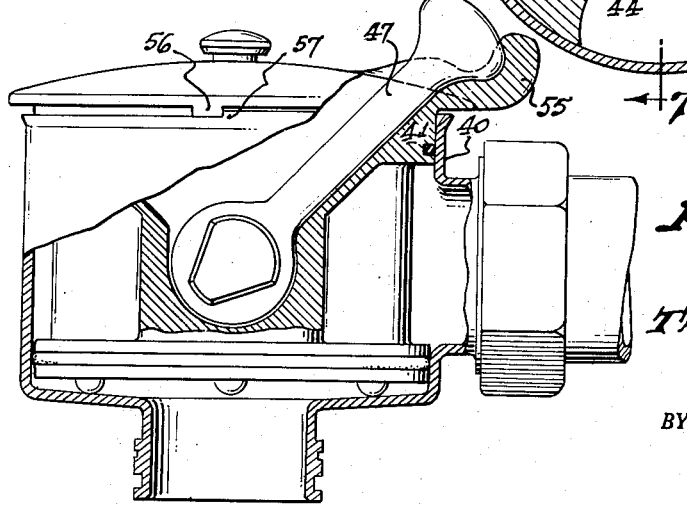
THEODORE A. STEHLIN,
INVENTOR,
BY *O.O.Martin*
ATTORNEY.

__UNITED STATES PATENT OFFICE__

2,952,269
Patented Sept. 13, 1960

2,952,269

REMOVABLE CORE-TYPE VALVE

Theodore A. Stehlin, 54 Grace Walk, Pasadena 2, Calif.

Filed Nov. 28, 1955, Ser. No. 549,285

9 Claims. (Cl. 137—270)

This invention relates to valves and has particular reference to an improved type of valve for use in the food industry.

One of the most pressing valve problems confronting the food industry is the instability of the fluids passing through and settling in the valves. Residue of such fluids remaining in the valves for short periods of time will by fermentation or otherwise quickly be subjected to such chemical transformation that additional fluid subsequently passing through the valve will be affected thereby.

It is in view of this the object of the present invention to provide a valve so constructed that it may at any time be taken apart and thoroughly cleansed without disturbing the connection of the valve with the conduit or conduits it is serving. Another object is to provide a valve of a composition which will not be affected by the acids or other chemical substances of the fluids passing through the valve. A still further object is to provide a valve of such transparency that the inner condition of and the flow through the valve may be visually checked at all times without separating or removing the valve.

These and other objects of the invention will be apparent upon perusal of the following detailed description and by referring to the accompanying drawings, of which:

Fig. 4 is like Fig. 2 and includes an additional feature hereinafter fully described;

Figs. 5-8 illustrate a somewhat modified form of the invention;

Fig. 9 is like Fig. 5, showing additional features the importance of which is hereinafter fully explained.

Fig. 10 shows another important feature of the invention.

Figure 1:
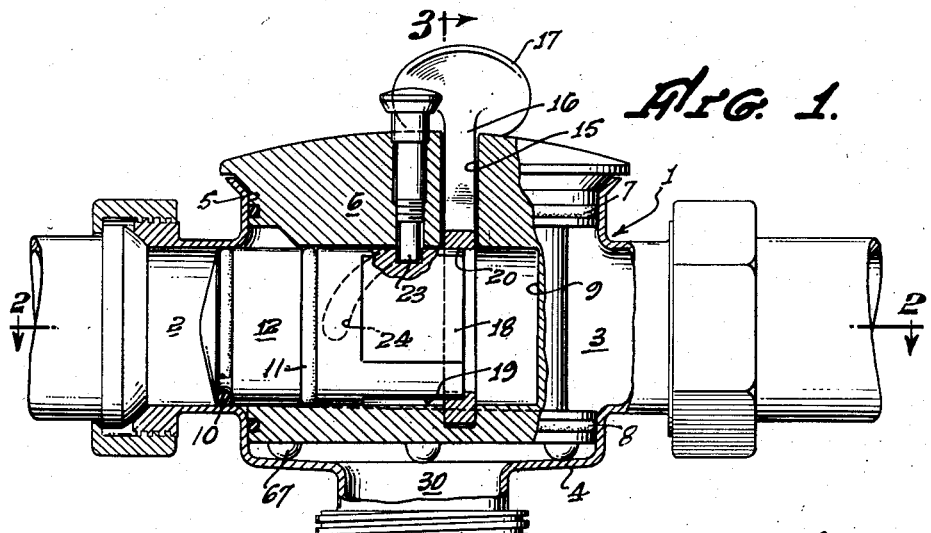
Fig. 1 is a side elevational view of a valve embodying the invention and with a portion thereof broken away in order better to illustrate the interior mechanism thereof.
Figure 2:
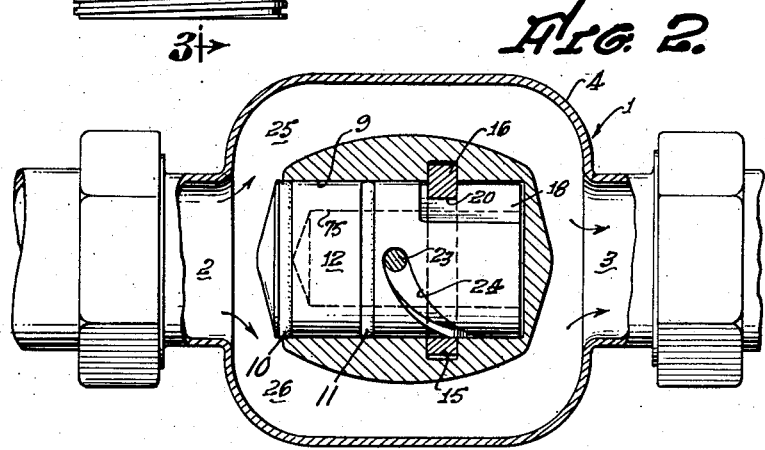
Fig. 2 is a substantially corresponding plan view of the device, the middle portion thereof being cut away on line 2—2 of Fig. 1.
Figure 3:
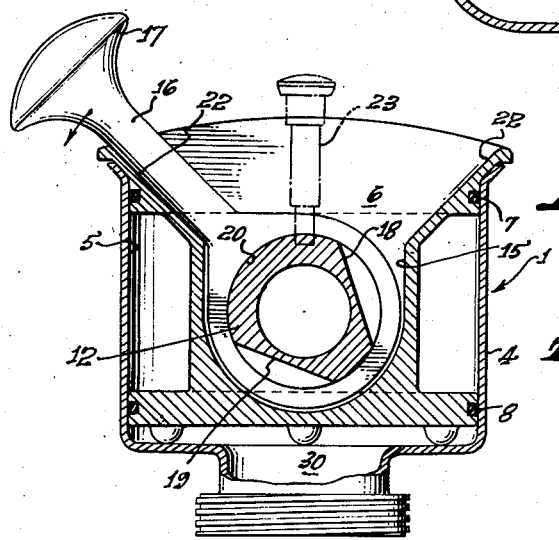
Fig. 3 is taken on line 3—3 of Fig. 1 in the direction of the arrows.

A valve casing 1, as illustrated in Figs. 1-3 of the drawings, is made from transparent material having an inlet passage 2 and an axially alined outlet passage 3. The main portion 4 of the casing is tubular in shape and of a size to provide therein a seat 5 for a valve support body 6, which hereinafter is referred to as the core of the device, and gaskets 7, 8 are seated in grooves of the core for contact with the seat 5 to provide therein leak-proof joints. The core is shown recessed from one side thereof to provide therein a cylindrical socket 9 in axial alinement with the inlet passage 2 and of the same diameter. A cylindrical valve stem 12 is seatable in the inlet passage and it extends into the socket, substantially as indicated in the drawings. The valve stem is, as indicated in Fig. 2, inwardly movable in its seat to open passages 25, 26 from the inlet 2 to the outlet 3 in the manner which will now be described.

A narrow slot 15 is sunk into the core to provide a guide for a valve actuating lever 16 which at the outer end thereof for convenience is fitted with a knob 17. The cylindrical valve stem 12 is at the inner end thereof shown recessed to provide inclined faces 18, 19, see Fig. 3, and the inner end of the lever is perforated to form a non-round opening 20 of a shape fittingly to seat on this cut-back or non-round portion of the stem. In practice, the lever is first lowered into the guide slot 15 whereupon the valve stem is pushed inwardly into engagement with the perforation of the lever. The groove in which the lever is seated is, at the upper end thereof, outwardly flared, substantially as indicated at 22 in Fig. 3, to provide space for oscillating movement of the lever through an arc of about 90°, in moving correspondingly to rotate the valve stem. The shaping of the inter-engaging lever and valve stem surfaces insures correct positioning of the stem within the core.

A pin 23 is seatable in the core 6 to extend into a helical groove 24 of the valve stem for the purpose of controlling axial adjustment thereof during the swinging movement of the lever 16 to rotate the stem. The length and inclination of the groove are calculated to afford movement of the stem into the position indicated in Fig. 2, thereby to open passages for fluid through the inlet passages 2 and through the spaces 25, 26 within the casing 1 to the outlet 3. While the valve remains in this position, it is seen that the fluid is free to flow through the spaces 25, 26 to the outlet.

As above pointed out, this type of valve is primarily designed for use in the food industry where alimentary fluids are caused to flow through conduits under low pressure. Since such fluids are mostly subject to fairly rapid deterioration it is important that the valve be so designed and constructed that every part thereof may be readily accessible for cleansing. It is for this purpose necessary, while the valve is in open position, to be able to lift the entire core assembly out of the casing, to remove the pin 23 therefrom and to withdraw the valve stem from the core. This may readily be done while the valve is in open position. The lever 16 may now be removed from its slot in the core. Every part of the valve may then easily be cleaned and quickly reassembled and all this may be done without disconnecting the valve from the conduit.

The casing may, as shown in the drawings, be made with a bottom outlet 30 for the purpose of simplifying the cleansing operation. When such outlet is provided it is, as above described, merely required to swing the lever to move the valve stem into the valve opening position of Fig. 2, whereupon the stem supporting assembly may be lifted out of the casing as a whole without removing the casing from the conduit. All sediments or impurities may then be removed from the inner wall of the casing and will be discharged through the bottom outlet 30. The core assembly is now reseated in the casing and it is important to note that no great care is needed correctly to seat the assembly. Should the casing 1 inadvertently have been reversed, it is merely found that the stem, in closing the valve, will enter the outlet passage 3. The valve will function perfectly in either position.

Referring now to Fig. 4, it is noticed that an additional outlet passage 35 extends from one side of the casing 36. The valve may otherwise remain as above described. Such additional outlet will be found of advantage in cases where it is required to direct the flow of the fluid through both outlet pasages to separate conduits. It may in other cases be found important to be able to attach the discharge conduit to one of the outlets rather than to the other. In such cases, it is merely required to place a suitable closure cap 37 on the outlet which is not to be used. It is for this purpose necessary to place screw threads in the cap for engagement with suitable screw threads 38 on the ends of the valve outlets securely to lock the cap in position. And it will be necessary also to place a gasket 39 in the cap to eliminate all danger of leakage.

A different method of converting the device of the invention into a three-way valve is illustrated in Figs. 5–8 of the drawings. The casing 40 is in this modified form made cylindrical in shape and of a diameter fittingly to receive therein a cylindrical valve support body, or core 41. The valve stem 42 is, like the stem 12, seatable in the inlet passage 43 for extension into a socket 44 of the core. The valve stem is at 45 shown helically grooved to receive the end of the pin 46 and a lever 47 is seated in a flaring slot 48 of the support body to rotate the valve stem, all substantially as above described.

The valve stem supporting core 41 is in this case mounted for rotation within the casing but locked against rotation by the stem while the valve remains in the position shown in Figs. 5 and 6 of the drawings. Fluid is now free to flow through the passages 50, 51 and 52 in either direction while the passage 43 remains closed. When it is required to change the direction of the flow it is merely necessary to swing the lever 47 to draw the valve stem entirely into the core which then becomes released for rotating movement to direct the flow through the passages 43, 50 or 43, 52 as may be required. The stem is then advanced to enter the outlet passage 50 or 52 whichever is to be closed. The core body is for convenient rotation shown fitted with a somewhat cup-shaped hand grip 55 in which the knob 49 of the lever 47 nestles when the lever is swung into the valve stem withdrawing position indicated in Fig. 7. A projection 56 is placed on the upper rim of the core for contact with stops 57 of the casing correctly to limit rotative movement of the core.

In conduits for unstable fluids, such as mostly found in the food industry, it is of great advantage to be able to check on fluids periodically. The casings as well as the core assembly within the casing is for this reason preferably made from suitable transparent plastic compositions. Complete check on the flow through the valve may then be made at any time without interrupting the flow through the conduit. It is also found advantageous, as indicated in Fig. 9, slightly to lower the outlet passage 60 relative to the inlet passage 61 and downwardly to slant the upper surface 62 of the lower portion of the core 63 to insure complete draining through the outlet passage 60 of any fluid that may remain after the flow through the valve is discontinued. This feature is also shown in Fig. 1 of the drawings.

While the gaskets 64, 65 may be depended upon to retain the core assembly in position without the casing, it may in some cases be found advantageous to provide means for locking the core assembly in set position. This may be done by placing a cap 70 in the lower outlet passage 66 of the casing. A threaded recess is for this purpose sunk into the bottom surface of the core and a threaded stud 71 of the cap is seatable therein to draw the core assembly downward into correct alinement of the valve stem with the adjacent passage of the casing. The lower surface of the core is for this purpose shown fitted with spherical knobs 67 which come to rest against the inner surface 68 of the casing. It is to be understood that this means of interlocking the parts is not limited to the structure shown in Fig. 9 but may be embodied in every form of the valve.

The valve stem may, as indicated at 75 in Fig. 2, be recessed from the inner end thereof in order to reduce the weight thereof and it may, as shown at 76, in Fig. 10, even be made tubular. It becomes necessary in this case to provide a closure for the end of the stem and an arcuate disk 77 is for this purpose shown seated in the end of the stem. The stem is throughout the drawings shown grooved to receive suitable gaskets 10, 11 and the gasket 78, seated in the groove 79 of Fig. 10, is in this case shown extended to form a cover 80 for the disk 77. When the stem is removed from the detached core for cleaning, it is merely required to pull the gasket out of its seat to release the disk for removal and every part may then be thoroughly cleaned.

I claim:

1. A device of the character described comprising, a casing having axially alined cylindrical passages at the ends thereof, a cylindrical valve stem having a helical groove in the surface thereof, a support for said stem seatable in the casing, the support having a cylindrical recess therein of a size to receive the valve stem, an element of the support extending into said groove, and manually operable means in the support for rotating the valve stem, the element in the groove imparting axial movement to the stem during rotation thereof to cause the stem to enter one of said passages.

2. A device as set forth in claim 1 in which the stem rotating means includes a slot in the support at right angles to the stem axis, the upper end of the slot being outwardly flared, and a lever seatable in the slot and engaging the end of the stem, swinging movement of the lever within the limits of the space within the flaring slot imparting rotation to the stem.

3. A device as set forth in claim 2 in which the element is detachable from the support to release the stem for withdrawal therefrom thereby to release the lever for removal from the support.

4. A valve which includes: a hollow casing, said casing having at least two passages leading into the interior thereof, at least one of said passages being cylindrical; a support for a valve stem mounted within said casing, generally between said passages, said support including a cylindrical recess open at one side of said support opposite said cylindrical passage, the axis of said recess being aligned with the axis of said passage, said support extending to the outside of said casing; means forming a seal between said support and said casing so as to seal the interior of said casing; a valve stem positioned within said recess, said valve stem being cylindrical and fitting within said recess so as to form a seal therewith, said valve stem including a helical groove formed on the exterior thereof within said recess and a non-round portion positioned within said recess remote from the open end thereof; pin means mounted on said support so as to extend into said recess and said groove; slot means formed in said casing so as to lead from the exterior thereof to said recess; lever means having a non-round opening in an end thereof extending through said slot means in said support, said lever means being movable with respect to said support, within said slot means, said non-round opening in said lever means fitting over and slightly engaging said non-round portion of said valve stem so that when said lever means is moved motion is transmitted to said valve stem, causing said valve stem to move from within said recess so as to extend within said passage so as to form a seal therewith.

5. A valve as defined in claim 4 including sealing means held upon the end of said valve stem remote from said non-round end, said sealing means forming a seal with the interior of said recess at all times, said sealing means being capable of forming a seal with the interior of said passage when said valve stem is moved so as to extend within said passage.

6. A valve as defined in claim 5 wherein said sealing means comprise: two sealing members, each of said members having at least a portion located in a groove extending around said valve stem, one of said sealing members forming a seal with the interior of said valve stem at all times and being capable of forming a seal with the interior of said passage when said valve stem is moved so as to extend within said passage.

7. A valve as defined in claim 4 wherein said two passages are in alignment with one another.

8. A valve as defined in claim 7 wherein said two passages are of the same diameter as said valve stem.

9. A valve as defined in claim 8 wherein said support is rotatably mounted within said valve casing, and including at least one other passage leading into the interior of said casing.

References Cited in the file of this patent

UNITED STATES PATENTS

| | | |
|---|---|---|
| 1,441,784 | Clayton | Jan. 9, 1923 |
| 2,124,359 | Weisgerber | July 19, 1938 |
| 2,237,014 | Stoehrer | Apr. 1, 1942 |
| 2,427,530 | Kuenhold | Sept. 16, 1947 |
| 2,490,944 | Buchanan | Dec. 13, 1949 |
| 2,501,635 | Schmidt | Mar. 21, 1950 |
| 2,531,759 | Wolf | Nov. 28, 1950 |
| 2,662,721 | Giauque | Dec. 15, 1953 |
| 2,670,173 | Stehlin | Feb. 23, 1954 |
| 2,732,848 | Guelson | Jan. 31, 1956 |